(12) United States Patent
Jerman et al.

(10) Patent No.: US 8,479,153 B2
(45) Date of Patent: *Jul. 2, 2013

(54) ABSTRACTING TRANSFORMATION FOR MODEL DRIVEN ARCHITECTURE

(75) Inventors: Stephen Jerman, Eagle, ID (US); Julie Oehler Schott, Colorado Springs, CO (US); Nathan John Sowatskey, Madrid (ES); Douglas R. Banks, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/348,122

(22) Filed: Jan. 11, 2012

(65) Prior Publication Data

US 2012/0110545 A1    May 3, 2012

Related U.S. Application Data

(63) Continuation of application No. 11/697,927, filed on Apr. 9, 2007, now Pat. No. 8,127,270.

(51) Int. Cl.
*G06F 9/44* (2006.01)
*G06F 9/45* (2006.01)

(52) U.S. Cl.
USPC .......................... 717/104; 717/105; 717/136

(58) Field of Classification Search
None
See application file for complete search history.

(56) References Cited

U.S. PATENT DOCUMENTS

| | | |
|---|---|---|
| 7,127,475 B2 | 10/2006 | Gotz et al. |
| 7,174,533 B2 | 2/2007 | Boucher |
| 2003/0225867 A1 | 12/2003 | Wedlake |
| 2006/0064667 A1 | 3/2006 | Freitas |
| 2006/0106626 A1 | 5/2006 | Jeng et al. |
| 2006/0130008 A1 | 6/2006 | Nguyen et al. |
| 2006/0130009 A1 | 6/2006 | Cornell et al. |
| 2006/0130011 A1 | 6/2006 | Cornell et al. |

(Continued)

FOREIGN PATENT DOCUMENTS

EP    1343078 A1    9/2003

OTHER PUBLICATIONS

Aizenbud-Reshef, N., et al., "Model traceability" IBM Systems Journal, http://www.research.ibm.com/journal/sj45-3.html, Model-Driven Software Development, vol. 45, No. 3, 2006.

(Continued)

*Primary Examiner* — Emerson Puente
*Assistant Examiner* — Charles Swift
(74) *Attorney, Agent, or Firm* — Baker Botts L.L.P.

(57) ABSTRACT

An example embodiment of the present invention provides a process for abstracting an implementation-independent model to an implementation-specific model during transformation in a MDA system. In the example embodiment, the MDA system comprises a transformation engine whose components might include software tools such as AndroMDA and Muse. The transformation engine accepts as input an implementation-independent model written in a modeling language such as UML that provides graphical notation to describe inheritable classes and their attributes and relationships. The transformation engine also accepts a configuration file which allows the designation of a class in the model as a manageable resource. From these inputs, the transformation engine creates a manageable resource corresponding to the class, which resource includes any subclasses by inheritance from the designated class unless the subclass is specifically excluded in the configuration file. In one embodiment, the manageable resources created by the transformation engine are WSMD manageable resources.

27 Claims, 11 Drawing Sheets

U.S. PATENT DOCUMENTS

2006/0259629 A1 11/2006 Usmani et al.
2007/0013697 A1* 1/2007 Gilboa ..................... 345/440
2007/0198667 A1 8/2007 Behrendt et al.

OTHER PUBLICATIONS

Batory, D., "Multilevel models in model-driven engineering, product lines, and metaprogramming", IBM Systems Journal, http://www.research.ibm.com/journal/sj45-3.html, Model-Driven Software Development, vol. 45, No. 3, 2006.

Larsen, G., "Model-driven development: Assets and reuse", IBM Systems Journal, http://www.research.ibm.com/journal/sj45-3.html, Model-Driven Software Development, vol. 45, No. 3, 2006.

Leroux, D., et al. "Rational Software Architect: A tool for domain-specific modeling", IBM Systems Journal, http://www.research.ibm.com/journal/sj45-3.html, Model-Driven Software Development, vol. 45, No. 3, 2006.

Balmelli, L., et al., "Model-driven systems development", IBM Systems Journal, http://www.research.ibm.com/journal/sj45-3.html, Model-Driven Software Development, vol. 45, No. 3, 2006.

Chowdhary, P., et al., "Model Driven Development for Business Peformance Management", IBM Systems Journal, http://www.research.ibm.com/journal/sj45-3.html, Model-Driven Software Development, vol. 45, No. 3, 2006.

Selic, B., "UML 2: A model-driven development tool", IBM Systems Journal, http://www.research.ibm.com/journal/sj45-3.html, Model-Driven Software Development, vol. 45, No. 3, 2006.

Czarnecki, K., et al., "Feature-based survey of model transformation approaches", IBM Systems Journal, http://www.research.ibm.com/journal/sj45-3.html, Model-Driven Software Development, vol. 45, No. 3, 2006.

Chandra, S., et al. "Using logical data models for understanding and transforming legacy business applications" IBM Systems Journal, http://www.research.ibm.com/journal/sj45-3.html, Model-Driven Software Development, 2006.

Troyer et al., "Modeling Complex Processes for Web Applications Using WSDM", 2003, ACM, pp. 1-12.

Jemiolo, "Create a WSDM interface for an HTTP server using Apache Muse", Nov. 2006, IBM, pp. 1-22.

Zhu et al., "MDAbench: A Tool for customized Benchmark Generation Using MDA", 2005, ACM, pp. 171-178.

Bock, Conrad: "UML 2 Composition Model", in *Journal of Object Technology*, vol. 3, No. 10, Nov.-Dec. 2004, pp. 47-73.

Sabbah, Daniel, General Manager, Introduction, IBM Systems Journal, http://www.research.ibm.com/journal/sj45-3.html, Model-Driven Software Development, vol. 45, No. 3, 2006.

Ritsko, John J. and David I, Seidman, Preface, IBM Systems Journal, http://www.research.ibm.com/journal/sj45-3.html, Model-Driven Software Development, vol. 45, No. 3, 2006.

Hailpern B., and P. Tarr, "Model-driven development: The good, the bad, and the ugly", IBM Systems Journal, http://www.research.ibm.com/journal/sj45-3.html, Model-Driven Software Development, vol. 45, No. 3, 2006.

Brown, A.W., S. Iyengar and S. Johnston, "A Rational approach to model-driven development", IBM Systems Journal, http://www.research.ibm.com/journal/sj45-3.html, Model-Driven Software Development, vol. 45, No. 3, 2006.

Abrams, S., et al., "Architectural Thinking and Modeling with the Architects' Workbench", IBM Systems Journal, http://www.research.ibm.com/journal/sj45-3.html, Model-Driven Software Development, vol. 45, No. 3, 2006.

Sinha, A., et al., "A measurement framework for evaluating model-based test generation tools", IBM Systems Journal, http://www.research.ibm.com/journal/sj45-3.html, Model-Driven Software Development, vol. 45, No. 3, 2006.

Aizenbud-Reshef, N., et al., "Model traceability", IBM Systems Journal, http://www.research.ibm.com/journal/sj45-3.html, Model-Driven Software Development, vol. 45, No. 3, 2006.

Chandra, S., et al. "Using logical data models for understanding and transforming legacy business applications" IBM Systems Journal, http://www.research.ibm.com/journal/sj45-3.html, Model-Driven Software Development, vol. 45, No. 3, 2006.

* cited by examiner

```
<wsdmConfig>
    <mangedResopurces>
        <include>com::cisco::nm::cmp::classes::ManagedElement </include>
        <exclude>com::cisco::nm::cmp::classes::InternalDingbat </exclude>
    </mangedResources>
    <properties>
        <attribute type="caption">com::cisco::nm::cmp::classes::Top::guiName </attribute>
        <attribute type="description">com::cisco::nm::cmp::classes::Top::description </attribute>
        <association name="Settings">com::cisco::nm::cmp::classes::DeviceHasSetting </association>
    </properties>
    <specNamespaces>
        <!-- Generics -->
        <namespace type="xsd" prefix="xs" uri="http://www.w3.org/2001/XMLSchema "/>
        <namespace type="xsd" prefix="wsdl" uri="http://schemas.xmlsoap.org/wsdl/ "/>
        <namespace type="xsd" prefix="soap" uri="http://schemas.xmlsoap.org/wsdl/soap/ "/>
    </specNamespaces>
</wsdmConfig>
```

Fig. 8

ABSTRACTING TRANSFORMATION FOR MODEL DRIVEN ARCHITECTURE

CROSS-REFERENCE TO RELATED APPLICATION

This application is a continuation of U.S. application Ser. No. 11/697,927 filed Apr. 9, 2007 and entitled "Abstracting Transformation for Model Driven Architecture".

TECHNICAL FIELD

The present disclosure relates to model driven architecture and model driven engineering.

BACKGROUND

Model Driven Architecture (MDA) is a framework for software development established by the Object Management Group (OMG), which presently maintains the standard for the Unified Modeling Language (UML), an object-oriented modeling language that includes graphical notation for classes, their attributes, and their relationships to one another (e.g., inheritance, association, and composition). As to both MDA and UML, see generally Model-Driven Software Development, IBM Systems Journal, Volume 45, Number 3 (2006).

The MDA framework generally involves three major steps. The first step is to build a model of the software system at a high level of abstraction so that the model is independent of any implementation technology. Typically this model is called a Platform Independent Model (PIM) and is written in a standard, well-defined modeling language such as UML. The second step is to transform the PIM into one or more Platform Specific Models (PSMs), each of which is tailored to a specific system in terms of the implementation constructs that are available in one specific implementation technology, e.g. a database model, an Enterprise JavaBean (EJB) model, etc. The third step is to transform a PSM to code—often code that supports the creation of a graphical user interface (GUI), such as Java.

Because a PSM fits its technology very closely, the transformation in the third step might be rather trivial in some instances, with the complex step being the second step in which a PIM is transformed to a PSM. Further an MDA transformation is typically executed by a software tool (e.g., a transformation engine), including both the transformation from a PIM to a PSM and the transformation from a PSM to code. Thus, one might think of the modeling that creates the PIM as very high-level programming.

Model Wizard is a software tool designed by Cisco that is based on Eclipse and that provides utilities for manipulating models created using modeling tools such as IBM's Rational Software Modeler, which can create UML 2.0 models.

AndroMDA is a software tool for code generation, originated by Matthias Bohlen, which takes a UML model as input and generates source code as output. Via a series of template files, AndroMDA is capable of producing source code in multiple programming and markup languages from a UML model, though, by default, the programming language is Java. More specifically, the AndroMDA code generator is a generic code generation engine that hosts code modules (called cartridges) which do the actual code generation. In turn, an AndroMDA cartridge is a collection of source code template files and Java helper classes (called Metafacades) packaged into a .JAR file. At the present time cartridges exist for Web-Service (e.g., the output can be WSDL files) and XMLSchema (e.g., the output can be XSD files), in addition to various Java platforms (e.g., the output can be EJB files). Other MDA transformation engines also use cartridge modules.

Muse is a software tool maintained by the Apache Software Foundation that implements the Web Services Distributed Management (WSDM): Management Using Web Services (MUWS) specification and creates WSDM-compliant interfaces from WSDL and XSD files. Those interfaces can then be used to generate Java source code. The WSDM MUWS specification is maintained by the Organization for the Advancement of Structured Information Standards (OASIS). The WSDM MUWS specification facilitates the distributed management (e.g., dynamic discovery and automated redirection based on resource availability) of interoperable machine-to-machine interaction over a network whose resources can be heterogeneous.

DESCRIPTION OF THE DRAWINGS

FIG. 8 is a diagram showing an example configuration file in XML format, which could be used with some embodiments of the present invention.

DESCRIPTION OF EXAMPLE EMBODIMENT(S)

In particular embodiments, the present invention provides methods, apparatuses, and systems directed to abstracting an implementation-independent model to an implementation-specific model (e.g., based on a particular platform or use case) during transformation in a MDA system. In a particular embodiment, the abstracting transformation might be performed in conjunction with a transformation engine which includes components such as Model Wizard, AndroMDA, and Muse, taking a UML model as input and outputting WSDM-compliant interfaces. The following example embodiments are described and illustrated in conjunction with apparatuses, methods, and systems which are meant to be examples and illustrative, not limiting in scope.

A. WSDM MUWS Specification

Figure 1:
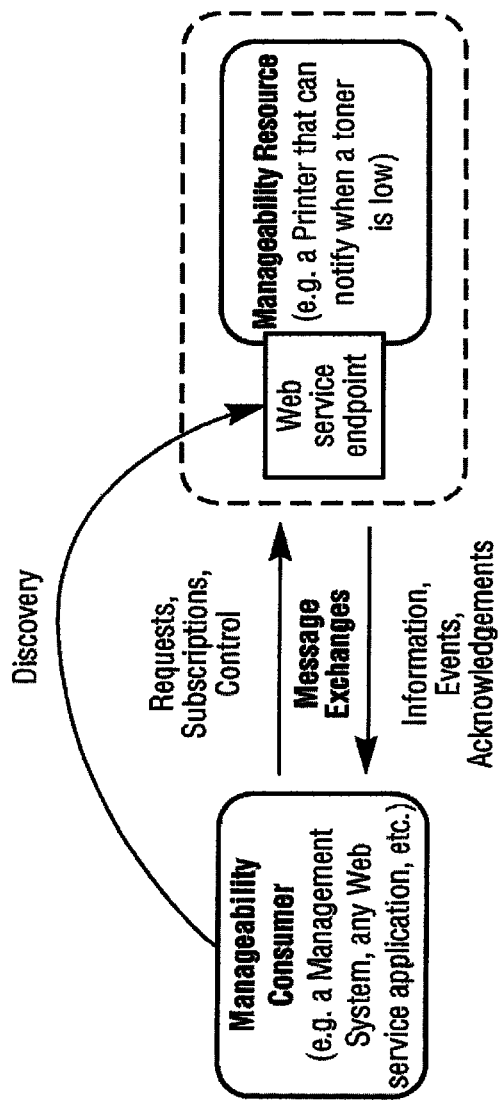
FIG. 1 is a diagram illustrating, for didactic purposes, an example Web service endpoint that provides access to a manageable resource, according to the WSDM MUWS specification.

By its own terms, the WSDM MUWS specification (MUWS 1.0 Part 1; Mar. 9, 2005) defines how the manageability of an arbitrary resource can be made accessible via Web services. The WSDM MUWS specification is based on a number of Web services specifications which mainly address messaging, description, discovery, accessing properties, and notifications. The basic concepts of management using Web services is illustrated in FIG. 1, which shows a Web service endpoint that provides access to a manageable resource. An example of a manageable resource is a printer that indicates when its toner is low, or, a magnetic storage disk that reports its internal temperature, or a router that warns of a possible denial of service attack. A manageability consumer discovers the Web service endpoint and exchanges messages with the endpoint in order to request information, subscribe to events, or, control the manageable resource associated with the endpoint. An example of a manageability consumer is a management system, a business automation process or, simply, any Web service application.

In order to discover the Web service endpoint providing access to a particular manageable resource, a manageability consumer first obtains an Endpoint Reference (EPR) and then obtains any other required descriptions, including, but not limited to, a WSDL document, an XML Schema, or a policy document. WSDM MUWS uses the same mechanisms, for obtaining EPRs and their associated descriptions as is used by regular Web service implementations and their applications. A Web service endpoint providing access to some manageable resource is called a manageability endpoint. To exchange messages with a manageability endpoint, a manageability consumer makes use of available descriptions for the endpoint. The manageability consumer sends messages targeted to the manageable resource using information contained in the EPR, for example, an address and some reference properties.

Figure 2:
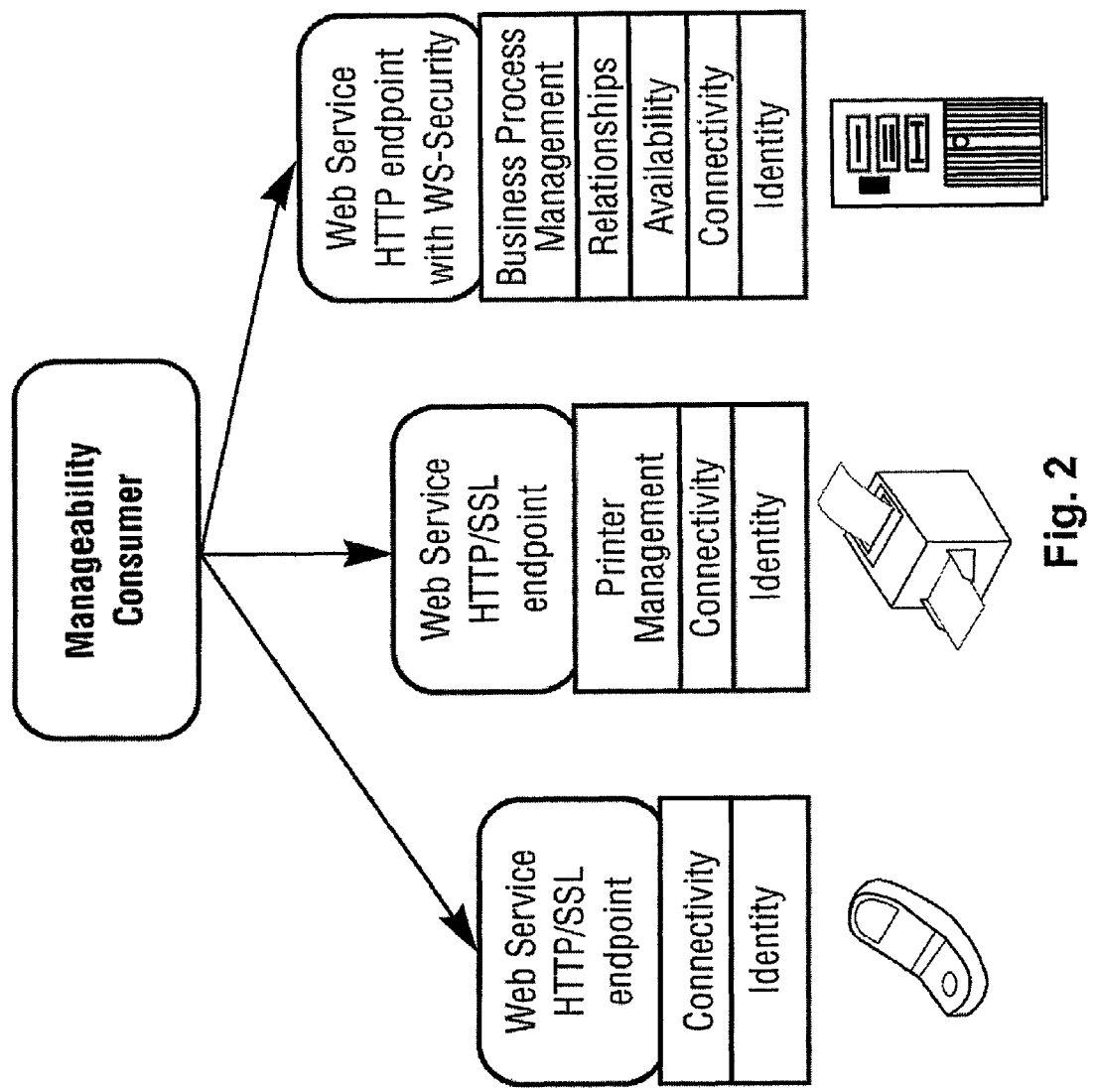
FIG. 2 is a diagram illustrating, for didactic purposes, possible resources which might be managed through Web services, according to the WSDM MUWS specification.

FIG. 2 is a diagram illustrating, for didactic purposes, possible resources which might be managed according to the WSDM MUWS specification. As explained there, the WSDM architecture provides appropriate coverage from low-end manageability of small devices like mobile phones to high-end manageability of very capable components like application servers, and business processes. This range of coverage is achieved by the low barrier to entry placed upon a WSDM implementation since there are few normative requirements made by the specification and the specifications on which it depends.

As shown in FIG. 2, a manageability consumer (which might be a machine) is connected to three manageable resources through Web service endpoints. The first manageable resource is a mobile phone whose manageable capabilities include connectivity and identity. The second manageable resource is a printer whose manageable capabilities include printer management properties (e.g., paper or toner level), in addition to connectivity and identity. The third managed resource is a business process whose manageable capabilities include business management properties (e.g., a metric for a task or activity), relationships, and availability, in addition to connectivity and identity.

Figure 3:
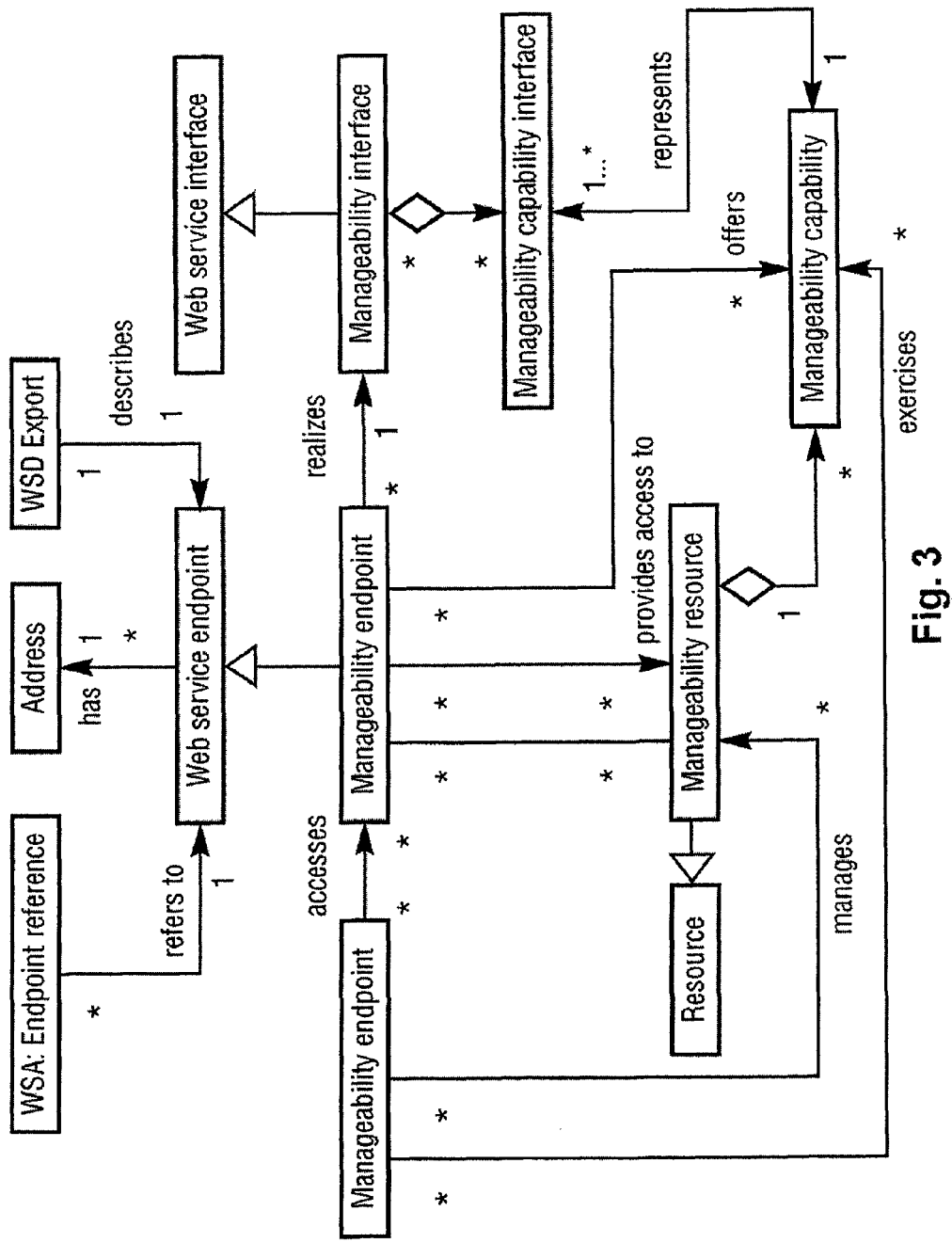
FIG. 3 is a UML diagram illustrating, for didactic purposes, a formal representation of the WSDM MUWS specification.

FIG. 3 is a UML diagram illustrating, for didactic purposes, a formal representation of the WSDM MUWS specification. According to this diagram, a manageability consumer accesses a manageability endpoint (e.g., an EPR) in order to exercise the manageability capabilities of a manageable resource.

B. System Architecture for Transformation Engine

Figure 4:
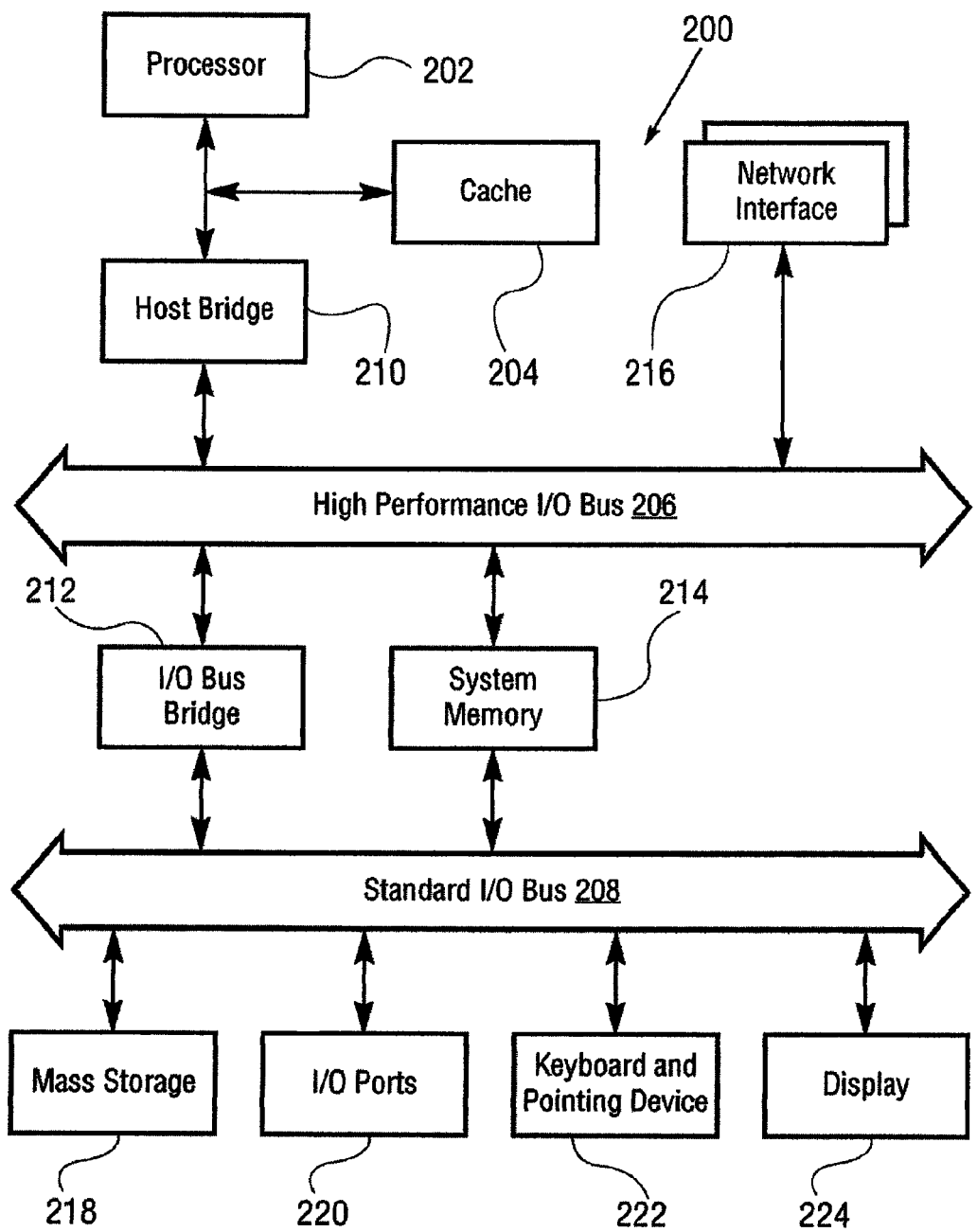
FIG. 4 is a diagram illustrating an example system architecture on which a transformation engine might execute in some embodiments of the present invention.

FIG. 4 illustrates, for didactic purposes, a hardware system 200, on which a transformation engine might execute. In some embodiments, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and multiple network/communication interfaces 216 couple to bus 206. Hardware system 200 may further include video memory (not shown) and a display device coupled to the video memory. Mass storage 218 and I/O ports 220 couple to bus 208. In some, but not all, embodiments, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interfaces 216 provide communication between hardware system 200 and any of a wide range of networks, such as an Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

The transformation engine described herein might be implemented as a series of software routines run by hardware system 200, in particular embodiments. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interfaces 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. The present invention may be used with any suitable operating system, such as the Windows® 95/98/NT/2000/XP/Vista operating system, available from Microsoft Corporation of Redmond, Wash., the Apple Macintosh Operating System, available from Apple, Inc., of Cupertino, Calif., UNIX operating systems, Linux, and the like.

C. Transformation Engine

Figure 5:
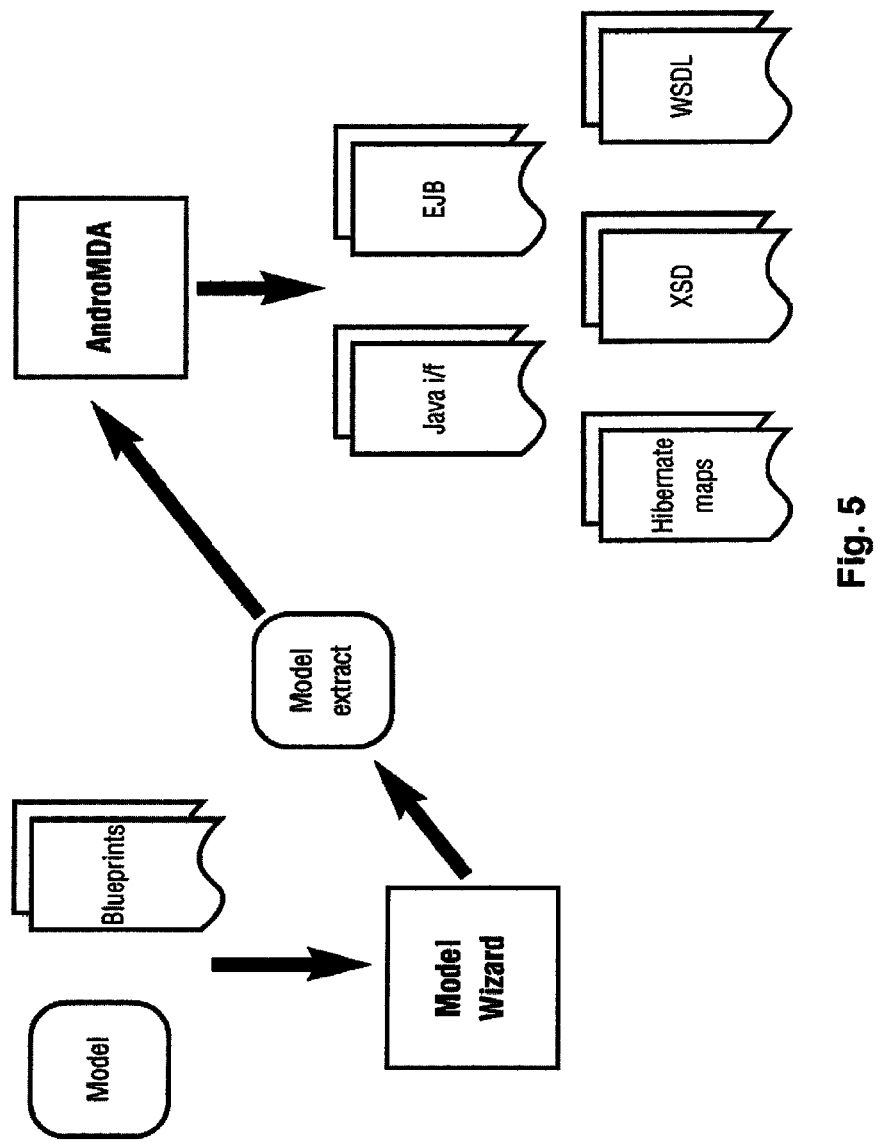
FIG. 5 is a diagram showing an example transformation engine, which might be used with some embodiments of the present invention.

FIG. 5 is a diagram showing an example transformation engine, which might be used with some embodiments of the present invention. As shown in the diagram, a full UML model is input into the Model Wizard, along with "blueprints" that specify a subset of the model that will make up a tool or system of tools. In particular, the blueprints define the associations, classes, interfaces, and properties required for the tool, system, or system of tools. The Model Wizard then exports a new model (e.g., in the EMX file format used by IBM's Rational Software Architect), which new model is a complete subset of the full model including any additional model object required to fulfill unspecified dependencies. The new model is then used as an input into AndroMDA to generate the desired artifacts, be they Java interfaces, EJBs, Hibernate (an object-relational mapping solution for Java) maps, WSDLs, and/or XSDs. Thereafter, additional processing of the artifacts might occur. For example, EJB artifacts might be input into an XDoclet plugin to generate wrappers. Or, WSDL and XSD artifacts might be input into Muse to generate WSDM interfaces.

In particular embodiments of the present invention, one or more instances of classes in a full UML model (e.g., Managed Elements in the example model below) might be exposed as a WSDM managed resource with a unique endpoint reference (e.g., based on the instanceID property in the example model below), where the managed resource is defined using a WSDL file that exposes standard WSDM operations (e.g., GetResourceProperty). Further, an attribute of a UML class might be defined as a standard WSDM capability (e.g. a metric) of the corresponding managed resource using a resource property document in a separate XSD.

Also in particular embodiments, a configuration file for an AndroMDA cartridge might be used to define which classes will be treated as managed resources, where any subclasses would be treated similarly for each defined class. Such a configuration file might also specify that specific attributes are to be treated as standard WSDM capabilities. The location of the configuration file might be passed into the AndroMDA cartridge as the "WSDMConfigFile" property within the XSD-WSDL namespace. In particular embodiments, the AndroMDA cartridge might be a custom AndroMDA cartridge that generates WSDM-compliant WSDLs and XSDs, using a template engine such as the Velocity software tool maintained by the Apache Software Foundation.

D. Configuration File

FIGS. 6A-6D are diagrams showing an XSD for a configuration file, which XSD might be used with some embodiments of the present invention. As shown in the XSD, the root element for the XSD's hierarchy is "wsdmConfig". At the next level of the hierarchy, there are three lists: (1) "managedResources"; (2) "properties"; and (3) "specNamespaces". According to the XSD, managedResources consists of a list of one-to-many element-qualified names of classes from the model, other than the model name. Specifically, if the element-qualified name of a class falls within "include" separators, the class corresponding to the name and any subclasses, are to be treated as WSDM managed resources, unless specifically excluded. Likewise, if the element-qualified name of a class from the model falls within "exclude" separators, the class corresponding to the name and any subclasses are not to be treated as WSDM managed resources, unless specifically included. As shown in the XSD, a list of zero-to-many element-qualified names of classes from the model might be excluded in this way.

Figure 6A:
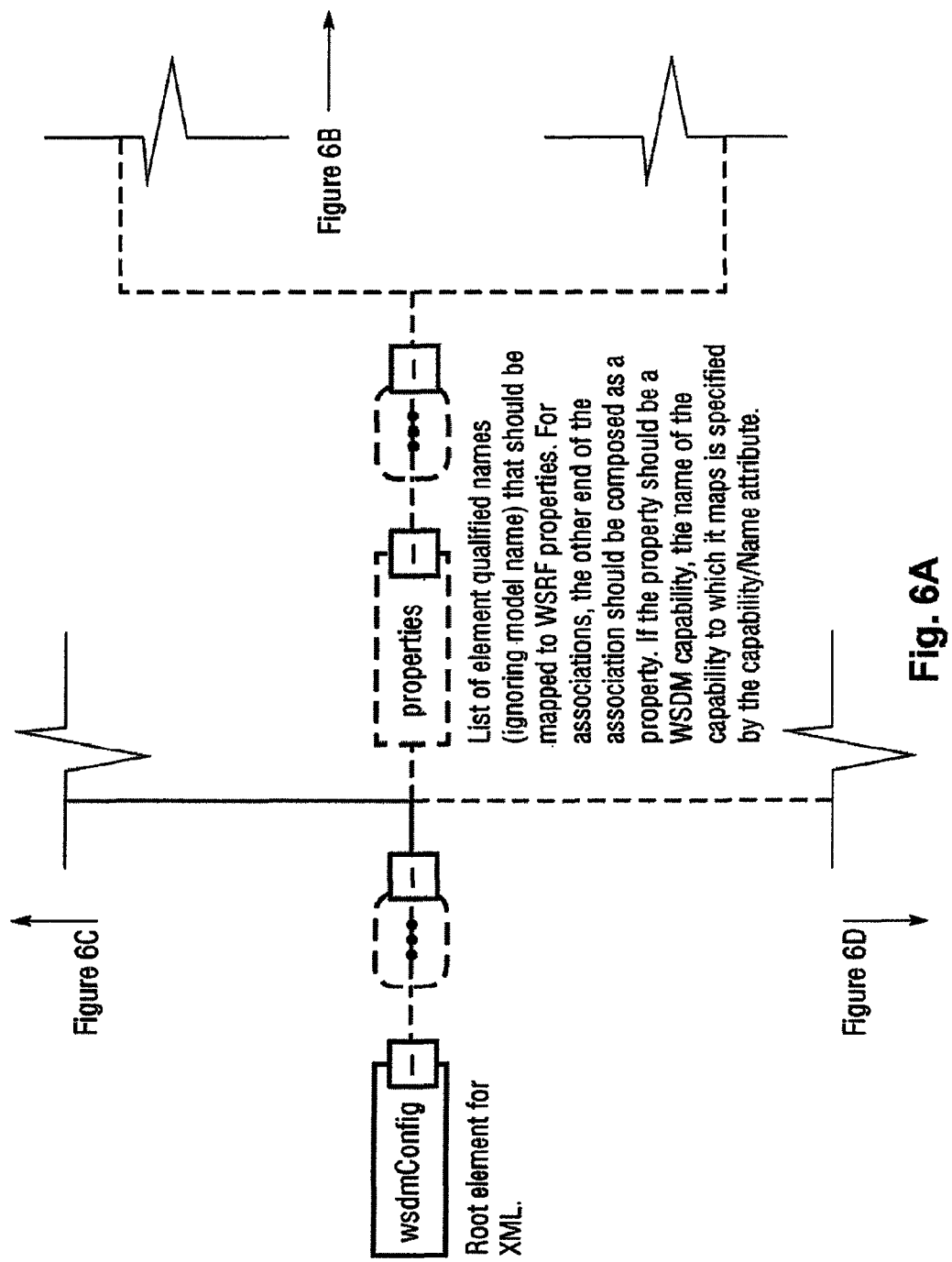
FIGS. 6A-6D are diagrams showing an example XSD for a configuration file, which XSD might be used with some embodiments of the present invention.
Figure 6A:
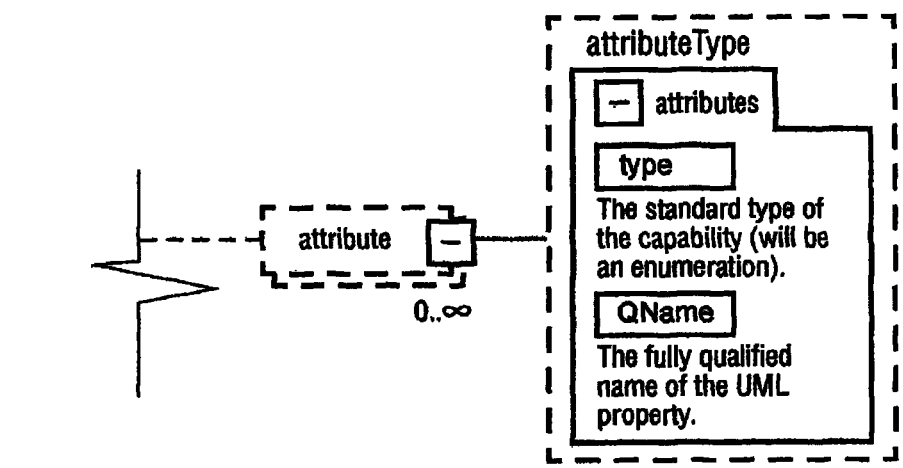
Figure 6B:
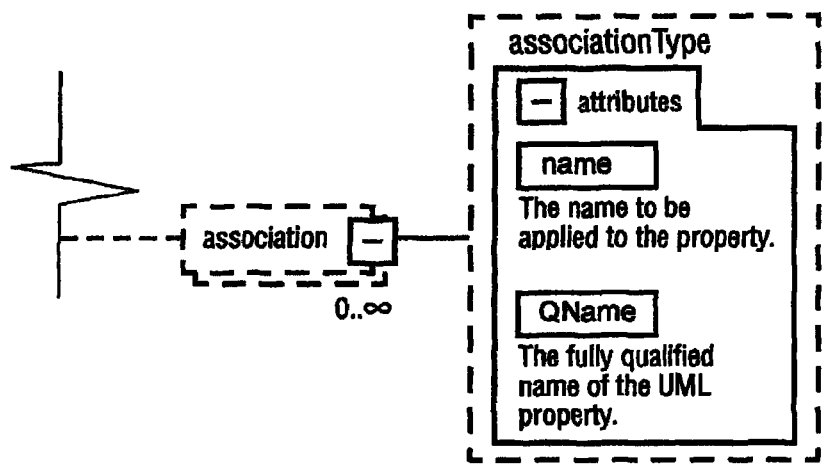
Figure 6C:
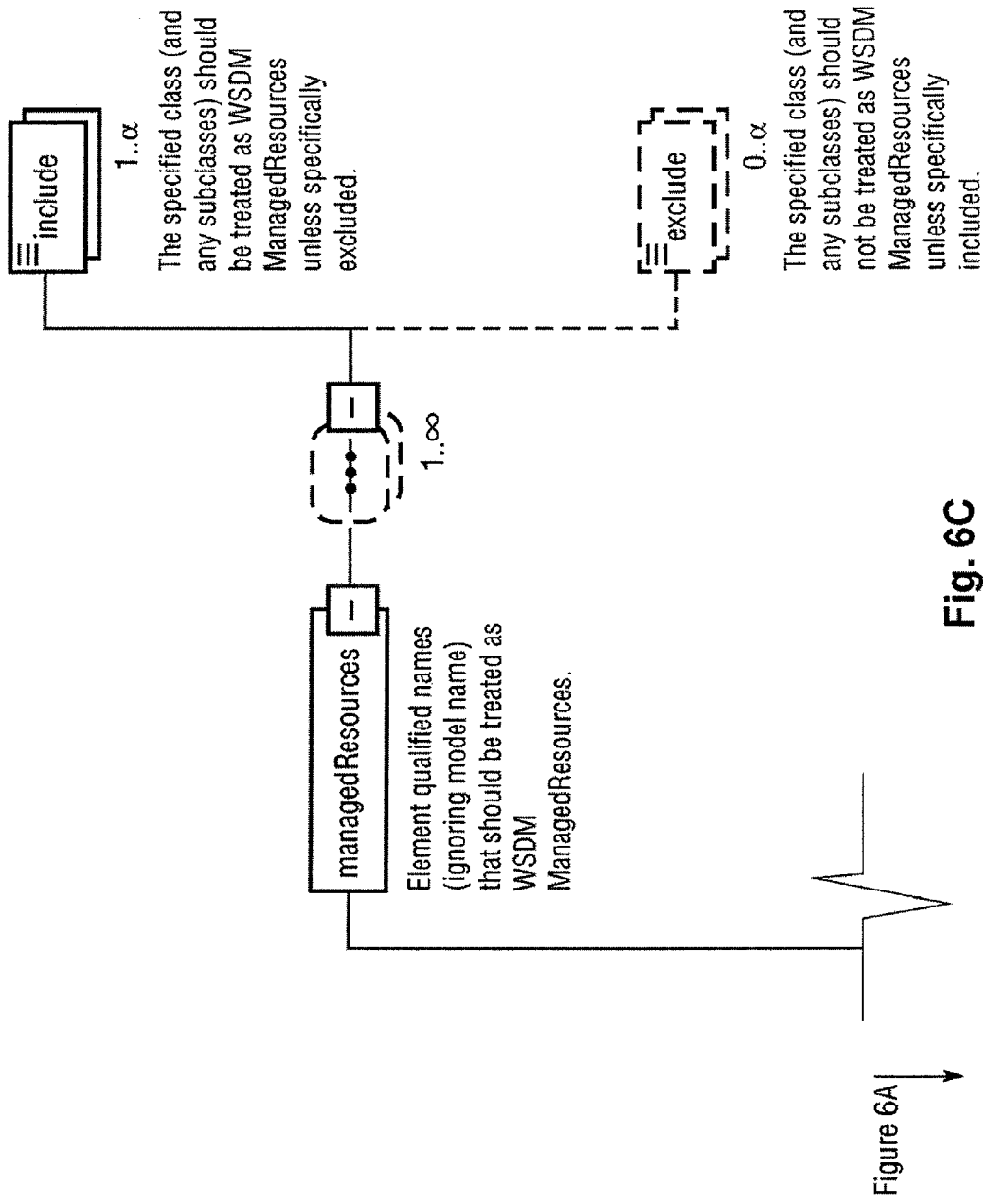

Also as shown in the XSD in FIGS. 6A-6B, "properties" may include a list of zero-to-many element-qualified names for attributes or associations from the model (other than the model name). Specifically, if the element-qualified name of an attribute falls within "attribute" separators, the attribute corresponding to the name is to be treated as a WSDM capability of a WSDM managed resource. It will be appreciated that such an attribute is a WSRF property within the meaning of OASIS's Web Services Resource Framework (Version 1.2; Apr. 1, 2006). Also as shown by the XSD, such an attribute might have a "type", which is an enumeration of a standard type of capability, and a "QName", which is the fully qualified name of the UML property.

In particular embodiments, the non-containing class of a composition is composed as an instance into the containing class, if the non-containing class is to be treated as a WSDM capability or WSRF property. (A composition is a type of association in UML, as explained in detail by Conrad Bock in UML 2 Composition Model, Journal of Object Technology, Vol. 3, No. 10, 2004). As shown by the XSD, this is accomplished by listing the element-qualified name of a composition from the model within "association" separators. Also as shown by the XSD, such a composition might have a "name" attribute, which is the name to be applied to the property, and a "QName" attribute, which is the fully qualified name of the UML property.

Figure 6D:
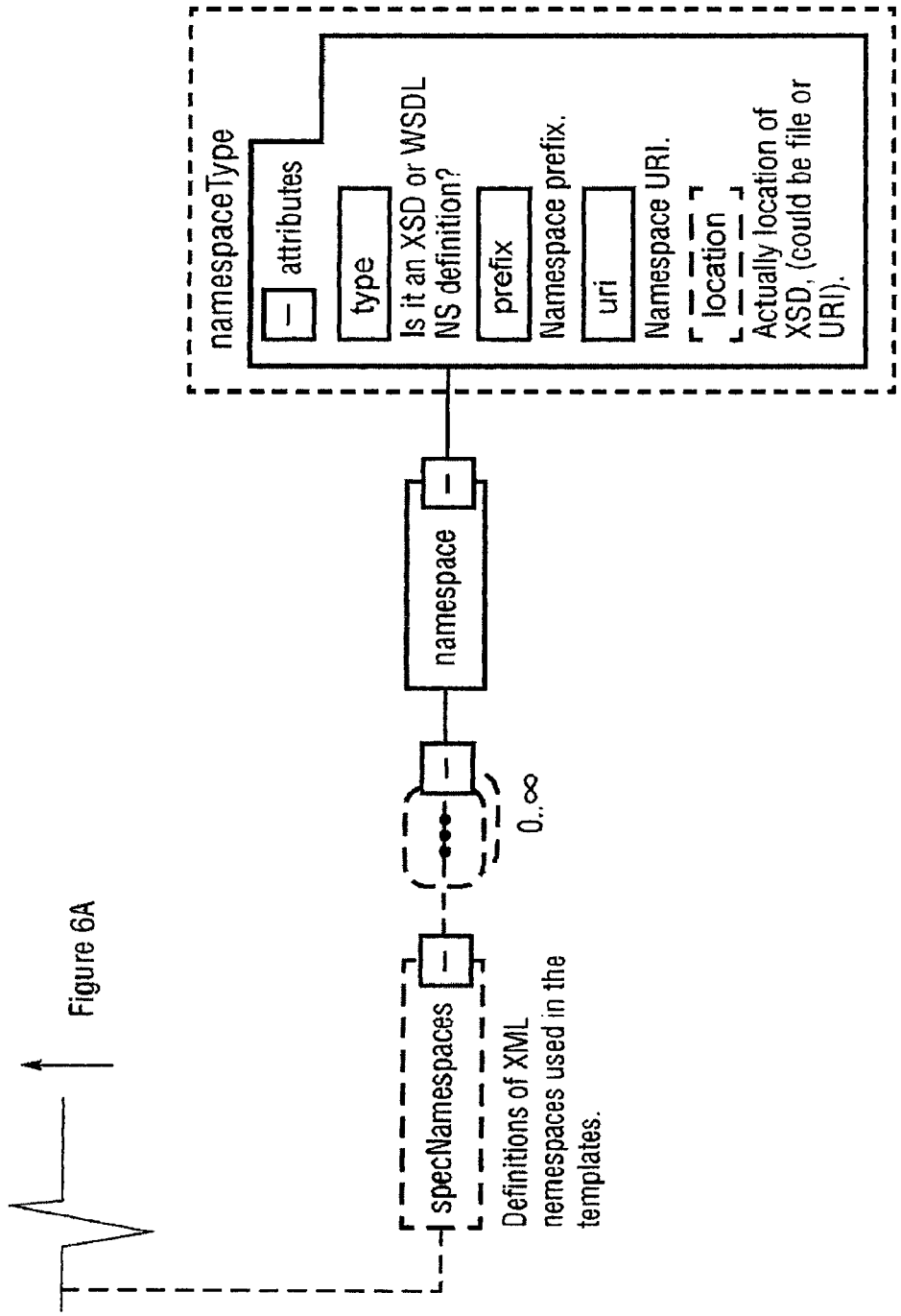

Additionally, as shown by the XSD in FIG. 6D, "specNamespaces" includes a list of zero-to-many XML namespaces which might be used in the WSDM managed resources resulting from the configured transformation. An XML namespace is added to the list by including it within "namespace" separators. Such a namespace might have: (1) a "type" attribute which indicates that it as an XSD or WSDL namespace definition; (2) a "prefix" attribute which indicates the namespace prefix; (3) a "uri" attribute which indicates the namespace URI; and/or (4) a "location" attribute which indicates the actual location of the namespace's XSD (e.g., a file or URI).

Figure 7:
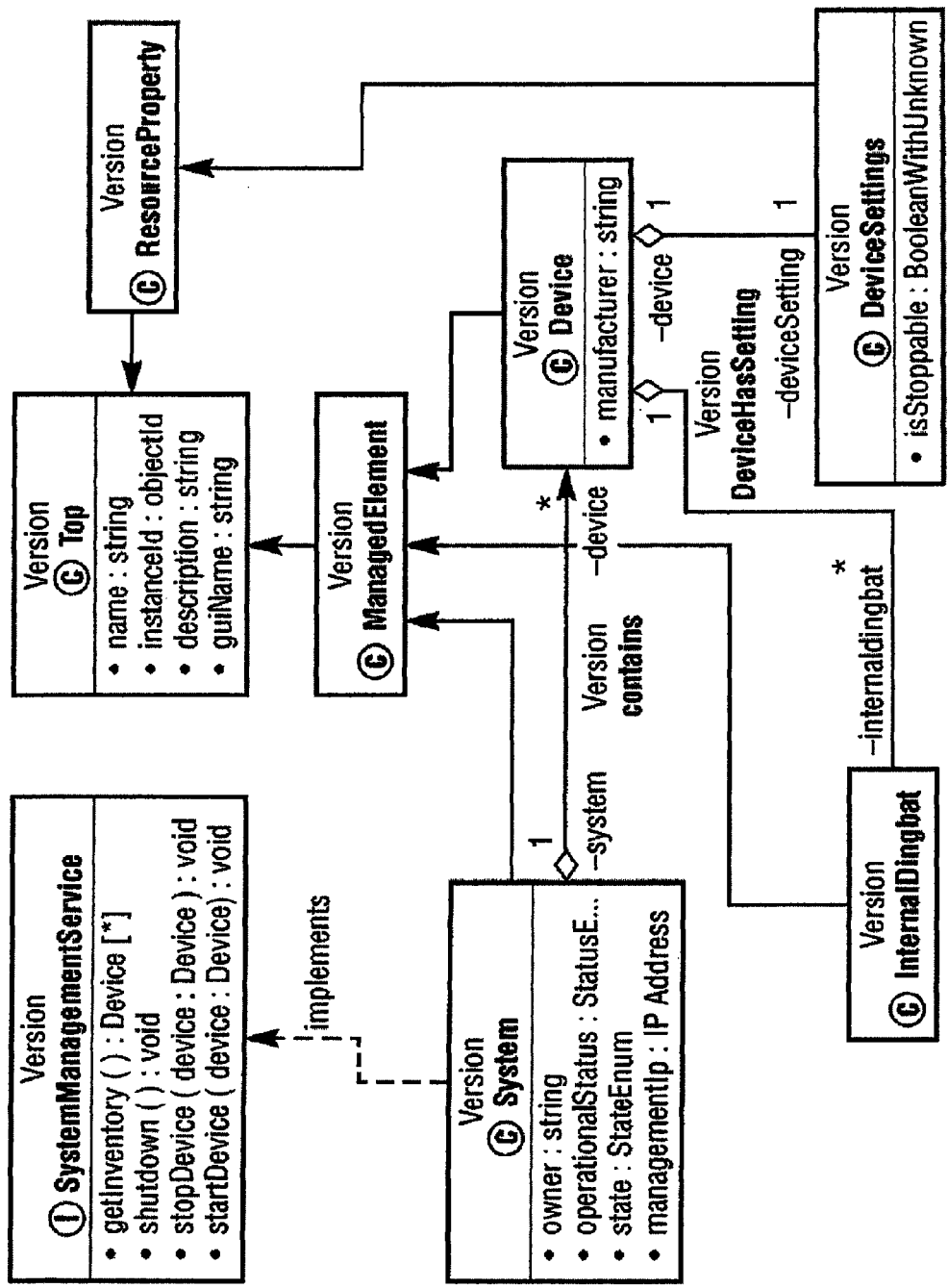
FIG. 7 is a class diagram showing an example UML model, which could be used with some embodiments of the present invention.

To show further details of how to use a configuration file in conjunction with an abstracting transformation, an example is useful. FIG. 7 is a class diagram showing an example UML model, which could be used with some embodiments of the present invention. As shown in FIG. 7, the UML model includes a class called ManagedElement, which inherits ("is a") from a base class called Top, which base class includes attributes called guiName and description (and the instanceID attribute mentioned earlier). The UML model also includes classes called Device and InternalDingbat which inherit from class ManagedElement. The class Device has a composition relationship with class InternalDingbat, e.g., a Device contains ("has a") an InternalDingbat, as shown by the association DeviceHasDingbat. And likewise, the class Device has a composition relationship with class DeviceSettings—e.g., a Device contains DeviceSettings, as shown by the association DeviceHasSetting.

FIG. 8 is a diagram showing an example configuration file in XML format, which could be used with some embodiments of the present invention. It will be appreciated that the configuration file in FIG. 8 conforms to the XSD shown in FIG. 6, but implements a specific use case for the UML model (e.g., it implements a more coarse-grain model based on the fine-grain UML model). Thus, the configuration file begins and ends with the separator "wsdmConfig". Next, there is a list of "managedResources" which "includes" the class ManageElement and excludes the class "InternalDingbat". Then comes a list of "properties" which includes the (inherited) attribute, guiName, whose type is a caption, and the inherited attribute, description, whose type is a description. The list of "properties" also includes an association, DeviceHasSetting, whose name is "Settings", and an association, DeviceHasDingbat. The configuration file ends with a list of "specNamespaces", which includes definitions of three generic XML namespaces (all of type xsd) whose respective URIs and prefixes are: (1) http://www.w3.org/2001/XML and xs; (2) http://schemas.xmlsoap.org/wsdl and wsdl; and (3) http://schemas.xmlsoap.org/wsdl/soap and soap.

In accordance with this configuration file, the class ManagedElement and all of its subclasses become a WSDM managed resource, except for the subclass InternalDingbat and any of its subclasses. Also, in accordance with this configuration file, the inherited attributes, guiName and description, become WSDM capabilities of the WSDM managed resource corresponding to class ManagedElement. Further, the DeviceSettings instance (at the non-containing end of the DeviceHasSetting composition) is composed into the Device class as a property, like the attribute, guiName, listed between the "attribute" separators. And the DeviceHasDingbat composition and the corresponding InternalDingbat instance are excluded from the WSDM managed resource (e.g., the generated WSDM-compliant XSDs and WSDLs).

Particular embodiments of the above-described transformation engine and configuration file might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. It will be appreciated that, in some embodiments, the modeling language might be other than UML or the transformation engine might include components other than Model Wizard, AndroMDA, and Muse. Further, it will be appreciated that a configuration file might be written in some mark-up language other than XML or in some language such as Perl or Python that is not a mark-up language. And it will be appreciated that the output of the transformation engine might be other than WSDM-compliant interfaces. For example, the output might be Java or C# source code in some embodiments. Or the output might even be another UML model, e.g., one abstracted for a particular use case. As a result, the invention is not limited to the specific examples and illustrations discussed above, but only by the following claims and their equivalents.

What is claimed is:

1. A method, comprising:
   accepting, by one or more computing devices, as a first input at a transformation engine, a data file containing an implementation-independent model written in a modeling language, wherein the implementation-independent model includes one or more inheritable classes each of which includes zero or more attributes and zero or more relationships to another class;
   accepting, by the one or more computing devices, as a second input at the transformation engine, a configuration file designating as a manageable resource one or more of the inheritable classes included in the implementation-independent model, wherein the manageable resource represents a device having manageable capabilities, and wherein the configuration file identifies one or more of the inheritable classes for exclusion; and
   outputting, by the one or more computing devices, at the transformation engine, each designated class as a manageable resource, wherein the manageable resource includes any subclasses by inheritance from the designated class unless excluded in the configuration file.

2. The method of claim 1, wherein the class relationships include association and composition.

3. The method of claim 2, wherein the configuration file designates, as a manageable resource capability, a composition with a class designated as a manageable resource and wherein the non-designated class in the composition is composed as an instance into the designated class when it is output by the transformation engine as a manageable resource.

4. The method of claim 1, wherein the manageable resource is a Web Services Distributed Management (WSDM) manageable resource.

5. The method of claim 1, wherein the configuration file designates, as a manageable resource capability, an attribute of a class designated as a manageable resource and the transformation engine outputs the designated attribute as a manageable resource capability.

6. The method of claim 5, wherein the manageable resource capability is a WSDM capability.

7. The method of claim 1, wherein the modeling language is UML.

8. The method of claim 1, wherein the transformation engine comprises the AndroMDA transformation engine.

9. The method of claim 1, wherein the transformation engine comprises the Muse software tool for creating WSDM-compliant interfaces.

10. Software stored in one or more computer-readable non-transitory storage media for execution and when executed operable to:
    accept, as a first input at a transformation engine, a data file containing an implementation-independent model written in a modeling language, wherein the implementation-independent model includes one or more inheritable classes each of which includes zero or more attributes and zero or more relationships to another class;
    accept, as a second input at the transformation engine, a configuration file designating as a manageable resource one or more of the inheritable classes included in the implementation-independent model, wherein the manageable resource represents a device having manageable capabilities, and wherein the configuration file identifies one or more of the inheritable classes for exclusion; and
    output, at the transformation engine, each designated class as a manageable resource, wherein the manageable resource includes any subclasses by inheritance from the designated class unless excluded in the configuration file.

11. The software of claim 10, wherein the class relationships include association and composition.

12. The software of claim 11, wherein the configuration file designates, as a manageable resource capability, a composition with a class designated as a manageable resource and wherein the non-designated class in the composition is composed as an instance into the designated class when it is output by the transformation engine as a manageable resource.

13. The software of claim 10, wherein the manageable resource is a Web Services Distributed Management (WSDM) manageable resource.

14. The software of claim 10, wherein the configuration file designates, as a manageable resource capability, an attribute of a class designated as a manageable resource and the transformation engine outputs the designated attribute as a manageable resource capability.

15. The software of claim 14, wherein the manageable resource capability is a WSDM capability.

16. The software of claim 10, wherein the modeling language is UML.

17. The software of claim 10, wherein the transformation engine comprises the AndroMDA transformation engine.

18. The software of claim 10, wherein the transformation engine comprises the Muse software tool for creating WSDM-compliant interfaces.

19. An apparatus, comprising:
a memory comprising computer readable instructions; and
a processor operable to execute the computer readable instructions to:
 accept, as a first input at a transformation engine, a data file containing an implementation-independent model written in a modeling language, wherein the implementation-independent model includes one or more inheritable classes each of which includes zero or more attributes and zero or more relationships to another class;
 accept, as a second input at the transformation engine, a configuration file designating as a manageable resource one or more of the inheritable classes included in the implementation-independent model, wherein the manageable resource represents a device having manageable capabilities, and wherein the configuration file identifies one or more of the inheritable classes for exclusion; and
 output, at the transformation engine, each designated class as a manageable resource, wherein the manageable resource includes any subclasses by inheritance from the designated class unless excluded in the configuration file.

20. The apparatus of claim 19, wherein the class relationships include association and composition.

21. The apparatus of claim 20, wherein the configuration file designates, as a manageable resource capability, a composition with a class designated as a manageable resource and wherein the non-designated class in the composition is composed as an instance into the designated class when it is output by the transformation engine as a manageable resource.

22. The apparatus of claim 19, wherein the manageable resource is a Web Services Distributed Management (WSDM) manageable resource.

23. The apparatus of claim 19, wherein the configuration file designates, as a manageable resource capability, an attribute of a class designated as a manageable resource and the transformation engine outputs the designated attribute as a manageable resource capability.

24. The apparatus of claim 23, wherein the manageable resource capability is a WSDM capability.

25. The apparatus of claim 19, wherein the modeling language is UML.

26. The apparatus of claim 19, wherein the transformation engine comprises the AndroMDA transformation engine.

27. The apparatus of claim 19, wherein the transformation engine comprises the Muse software tool for creating WSDM-compliant interfaces.

* * * * *